United States Patent [19]

Mesinger

[11] 4,063,775

[45] Dec. 20, 1977

[54] UNITARY CYCLE SEAT SUPPORT UNIT

[76] Inventor: Robert H. Mesinger, 4 Lake Crest Drive, Danbury, Conn. 06810

[21] Appl. No.: 618,822

[22] Filed: Oct. 2, 1975

[51] Int. Cl.$^2$ .............................................. B62J 1/00
[52] U.S. Cl. .................................... 297/201; 297/214
[58] Field of Search ............... 297/201, 195, 312, 202, 297/214, 200

[56] References Cited

U.S. PATENT DOCUMENTS

| | | | |
|---|---|---|---|
| 576,192 | 2/1897 | Hoyt | 297/201 |
| 591,330 | 10/1897 | Downes | 297/201 |
| 602,732 | 4/1898 | Craig | 297/200 |
| 635,598 | 10/1899 | Rowe | 297/201 |
| 679,537 | 7/1901 | Naber | 297/201 X |
| 694,875 | 3/1902 | Meighan | 297/201 |
| 1,152,172 | 8/1915 | Gustafson | 297/196 |
| 3,243,231 | 3/1966 | Duffy | 297/195 |
| 3,476,496 | 11/1969 | Golden | 297/203 X |
| 3,758,154 | 9/1973 | Kitaguchi | 297/203 |

Primary Examiner—Roy D. Frazier
Assistant Examiner—Darrell Marquette

Attorney, Agent, or Firm—Mattern, Ware, Davis and Stoltz

[57] ABSTRACT

By providing a unitary, molded cycle seat support unit which incorporates a seat member, a forwardly extending nose portion, a support frame interconnecting said seat member with said nose portion, along with a plurality of support ribs extending between and interconnecting the support frame with the seat member, a unique, unitary, cycle seat support unit is achieved capable of flexible movement in the seat member area in response to the demands of the rider. Preferably, the plurality of support ribs employed have varying thickness along their lengths, and are mounted between the support frame and the seat member in a cantilevered arrangement. Also, in the preferred embodiment the seat member is bifurcated with respect to the support frame, forming two independently supported seat portions. In this way, both flexibility and support are achieved in varying amounts depending upon the demands of the area. The seat support unit is primarily to be employed with a saddle cover unit and various paddings of rubber or plastic to provide additional comfort and aesthetic appeal to the rider.

16 Claims, 8 Drawing Figures

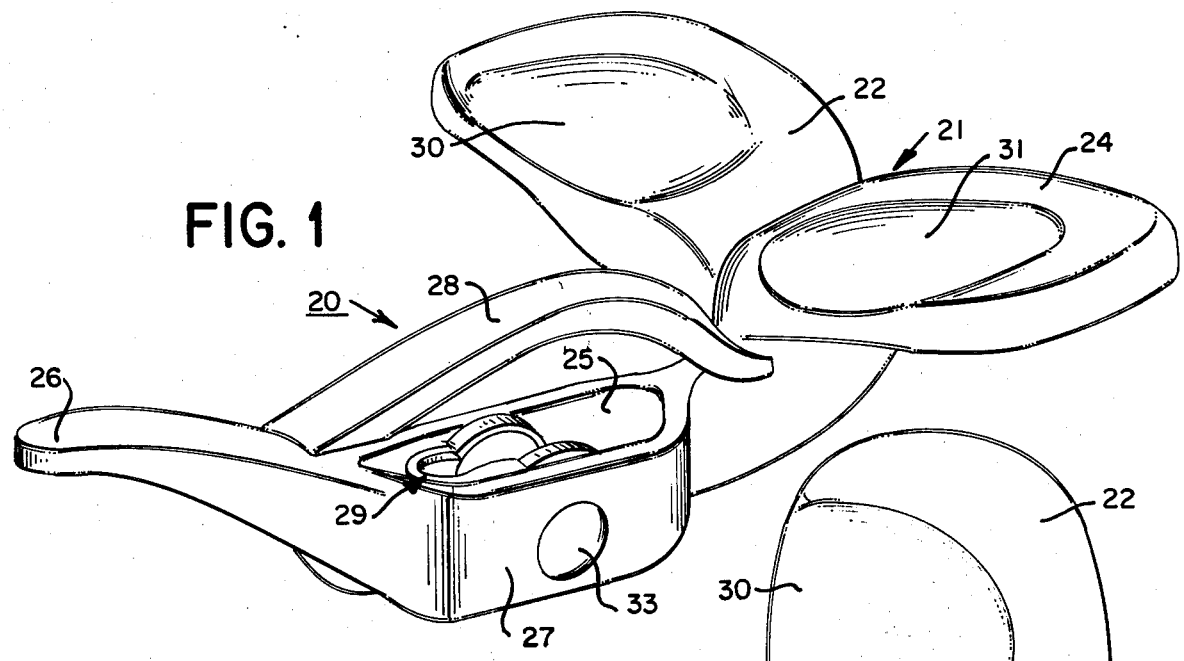
FIG. 1
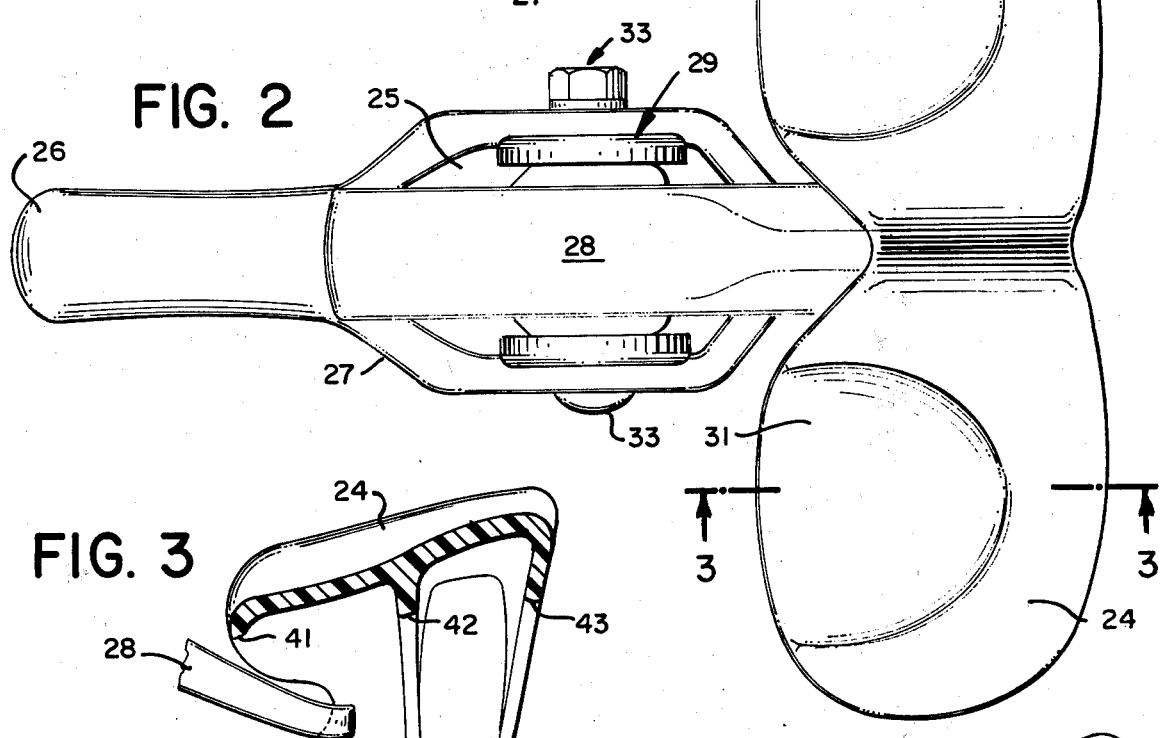
FIG. 2
FIG. 3
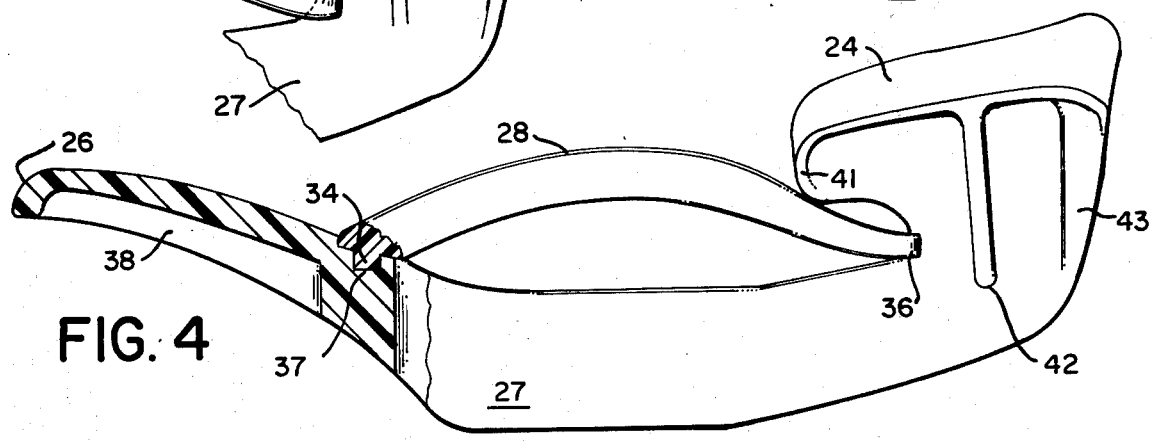
FIG. 4

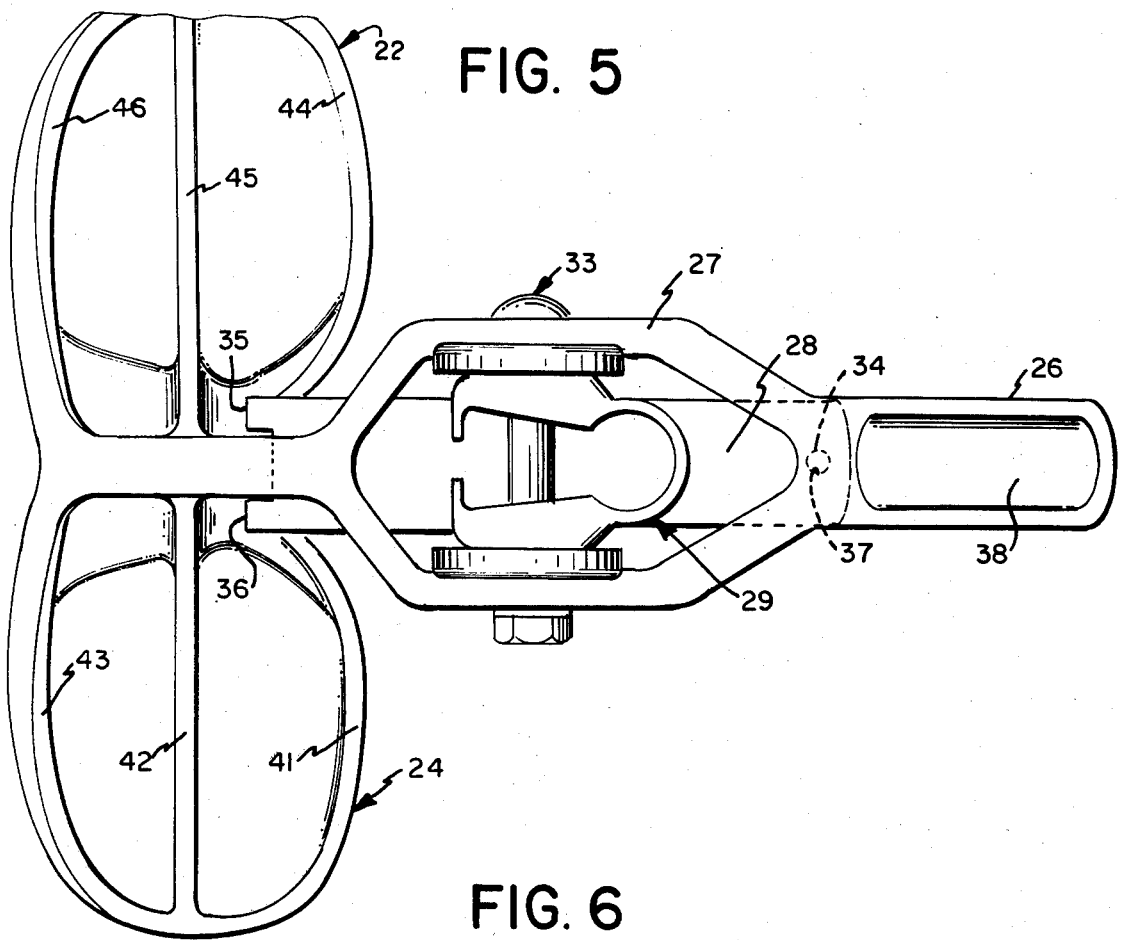
FIG. 5
FIG. 6
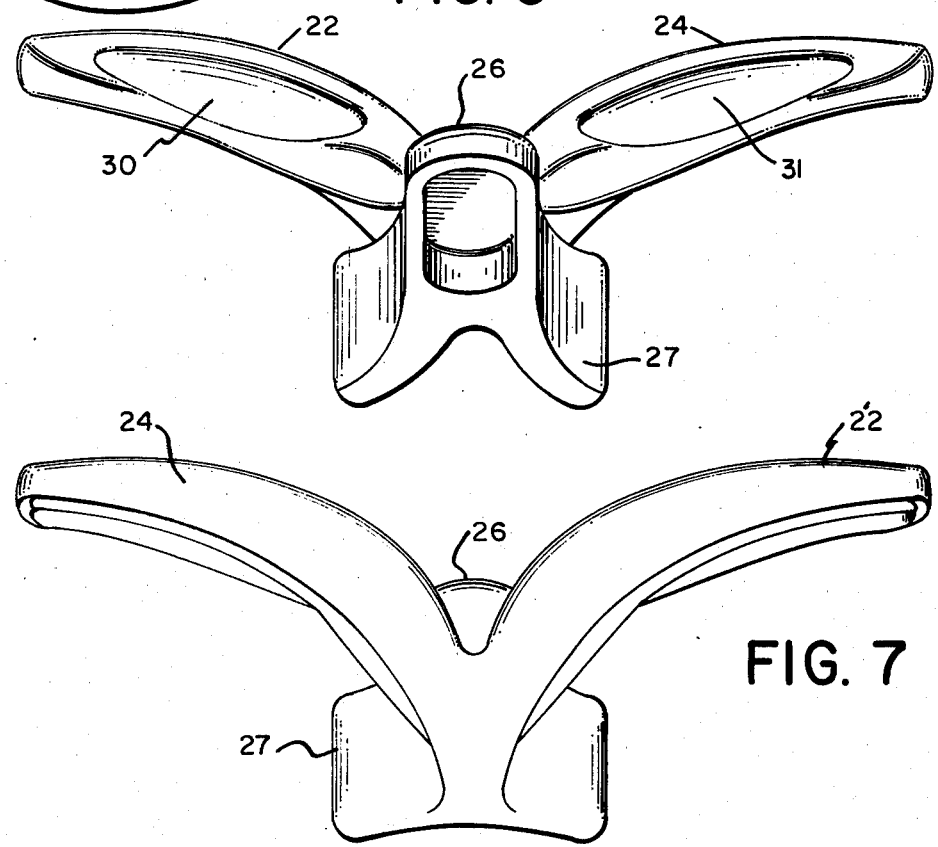
FIG. 7

UNITARY CYCLE SEAT SUPPORT UNIT

BACKGROUND OF THE INVENTION

This invention relates to cycle seat support units and more particularly to unitary, molded, cycle seat support units.

In the cycle industry, much development has been achieved during the many years of the existence of the various type of cycles. However, one area which has traditionally suffered from great innovations is the cycle seat support unit. Throughout the years, cycle seats have experienced many variations in size, shape, and materials, but the support unit to which the cycle seat is secured has consistently been manufactured with various combinations of spring arrangements through the years in order to provide the cycle seat with the support and resilience necessary for the rider. In the bicycle field, the spring construction is also employed to provide the seat with sufficient flexibility to allow the seat to move with the rider as he pedals, shifting his weight from side to side.

In general, cycle seat support units have experienced wide developmental activity in materials construction and varying spring designs, but they have consistently been manufactured from a plurality of interconnected parts, virtually always employing a spring arrangement.

Therefore, it is a principal object of this invention to provide a cycle seat support unit which is capable of both supporting a rider and flexibly moving with the demands of the rider, without the use of any spring arrangement.

Another object of this invention is to provide the cycle seat unit defined above which insulates against road shocks as well as providing support and flexibility.

Another object of this invention is to provide the cycle seat unit defined above, which is inexpensive to manufacture and readily assembled onto a cycle.

A further object of this invention is to provide the cycle seat unit defined above, which is capable of enduring all of the demands placed upon it by the rider, while also providing the rider with a comfortable, supported ride.

Other objects of the invention will in part be obvious and will in part appear hereinafter.

SUMMARY OF THE INVENTION

The cycle seat support unit of this invention avoids the prior art dilemma of having a plurality of parts which must be assembled, since this seat support unit is unitary throughout, capable of being molded as a single product. Preferably, a plastic is employed for molding the support unit.

The cycle seat support unit of this invention incorporates a seat member, a nose or pommel portion, and a support frame interconnecting the seat portion with the nose portion. In the preferred embodiment the cycle seat support unit of this invention incorporates a bifurcated seat member, each portion of which is supportably interconnected with the support frame by ribs in a cantilevered arrangement. In this way, each seat portion is free to act independently of the other, capable of flexing as the rider shifts his weight in that direction while supporting the rider on the other side without flexing.

Furthermore, in the preferred embodiment, the support ribs vary in thickness from front to back with the greater thickness being at the rear. In this way, secure support for the rider is assured at the rear of the seat portions where no flexing is required while support and maximum flexing is assured at the front of the seat portions where the maximum flexing is required. Since a plurality of ribs can be employed, the degree of flexing and support can be controlled from front to back, providing the rider with the exact amount of support and flexibility needed for a comfortable ride while also absorbing road shocks.

The unitary cycle seat support unit of this invention also incorporates a bridge or cover portion extending from the nose or pommel portion to the seat member. The bridge portion is employed to extend over the clamping system used to mount the cycle seat support unit on the post of the cycle. In this way, unwanted entry into this area is prevented and possible injury is avoided. This bridge portion either comprises securing means at both ends thereof to assure its retention in the desired position, or is molded in place with the molding of the unitary support unit. The bridge may also be used to secure any additional padding to support unit.

The invention accordingly comprises a product possessing the features, properties, and relation of components which will be exemplified in the product hereinafter described, the scope of the invention will be indicated in the claims.

THE DRAWINGS

For a fuller understanding of the nature and objects of the invention, reference should be had to the following detailed description taken in connection with the accompanying drawings, in which:

FIG. 1 is a perspective view of the cycle seat support unit of this invention;

FIG. 2 is a top plan view of the cycle seat support unit of this invention;

FIG. 3 is a side elevation view partially in cross-section of the cycle seat support unit of this invention taken along line 3—3 of FIG. 2;

FIG. 4 is a side elevation view of the cycle seat support unit of this invention;

FIG. 5 is a bottom view of the cycle seat support unit of this invention;

FIG. 6 is a front elevation view of the cycle seat support unit of this invention; and FIG. 7 is a rear elevation view of the cycle seat support unit of this invention.

DETAILED DESCRIPTION

Figure 8:
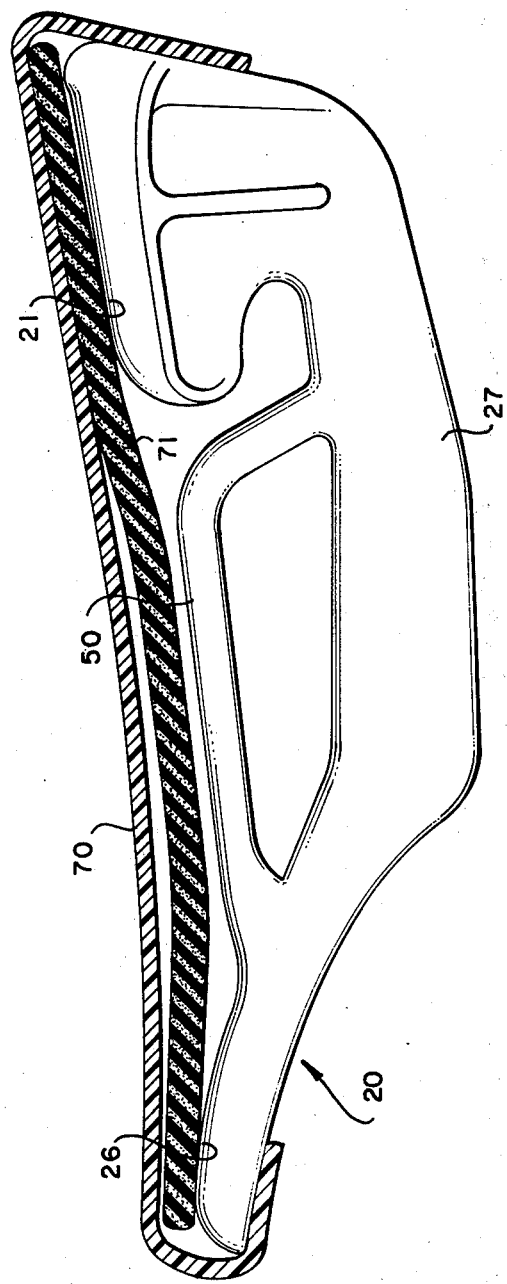
FIG. 8 is a side elevation view of another embodiment of the cycle seat support unit of this invention.

As shown in FIG. 1, cycle seat support unit 20 comprises, in the preferred embodiment, a seat member 21 incorporating two independent seat portions 22 and 24, a forward nose or pommel portion 26, and an integral support frame 27 interconnecting the pommel portion 26 with seat portion 22 and 24. In the preferred embodiment, support frame 27 incorporates an open mounting zone 25 peripherally enclosed by support frame 27 in which a bracket assembly 29 is securely mounted to support frame 27 by bolt means 33. Bracket assembly 29 is well-known in the art and is employed for securing cycle seat support unit 20 to a cycle seat post (not shown).

As is well-known in the art, padding material 71 and a cycle saddle cover 70 are mounted on cycle support 20 in order to complete the construction of a cycle saddle. Since padding material 71 and saddle covers 70 are well-known in the art, they have been shown only in FIG. 8 for exemplary purposes. Furthermore, as is obvious to one skilled in the art, the cycle seat support unit disclosed herein is usable on all types of cycles, but for the purposes of illustration only, the specification from hereout will deal in particular with bicycle saddles. It is believed the bicycle saddles present the most difficult problems since they must be able to not only comfortably support the rider's weight over rough terrain, but must also be able to flex in response to the rider's pedalling movements. However, this description is for purposes of illustration only and is not intended in any way to limit the scope of this invention.

In one embodiment, bicycle seat support unit 20 incorporates an optional removable bridge or cover 28 extending from the rear of pommel portion 26 to the front of seat portions 22 and 24, covering bracket assembly 29, and bridge 28 may be anchored at both ends to unit 20 by rivetting, ultrasonic welding, cementing or any other suitable means. In the embodiment of FIGS. 4 and 5, bridge 28 incorporates a boss 34 at its forward end and two extension tabs 35 and 36 at its rear end. Tabs 35 and 36 are in juxtaposed spaced relationship to each other and positioned to peripherally surround and engage frame member 27 directly below seat portions 22 and 24. With the rear end of bridge 28 in secure abutting contact with frame member 27 beneath seat portions 22 and 24, the forward end of bridge 28 is locked in position with boss 34 frictionally engaged within recess 37 at the rear of pommel portion 26. By employing this construction, bridge 28 is separately manufacturable while still being quickly and easily secured in position on bicycle seat support unit 20.

In another embodiment, the trunk or mounting zone bridge is integrally molded with the entire seat support unit. As shown in FIG. 8, seat support unit 20 incorporates nose or pommel portion 26, support frame 27, seat member 21, and bridge 50. Bridge 50 is integrally molded in position with the entire seat support unit in a single, efficient molding operation. As shown in FIG. 8, bridge 50 extends from the rear of pommel portion 26 to support frame 27 in front of seat member 21, thereby covering the bracket assembly. In the preferred embodiment, bicycle seat support unit 20 incorporates bridge 28 or 50 in order to assure that the rider is not injured by unwanted entry into the trunk or mounting zone 25. Furthermore, bridge 28 and 50 in combination with pommel portion 26 and seat portions 22 and 24 provide an additional supporting point for the padding and the bicycle seat cover which are placed over bicycle seat support unit 20 in order to complete the bicycle seat assembly.

Bicycle seat support unit 20 of this invention incorporates a forward nose or pommel portion 26 as is commonly used in the art in order to provide the saddle construction with a generally triangular shape and establish a forward mounting area for the padding and the saddle cover. Furthermore, the pommel portion 26 provides added support to the entire unit imparting added rigidity and strength thereto, while also being flexible in order to dampen road shocks. As best seen in FIGS. 4 and 5, pommel portion 26, in its preferred embodiment, incorporates a recess zone 38 in order to reduce the overall weight of support unit 20. However, as would be obvious to one skilled in the art, pommel portion 26 could be manufactured with a uniform cross-section throughout or could be entirely eleminated if only seat portions 22 and 24 were desired.

Bicycle seat support unit 20 of this invention incorporates, in its preferred embodiment, two independent seat portions 22 and 24, both of which are independently mounted to support frame 27 in a cantilevered arrangement. This cantilevered construction is extremely important in providing the flexibility and rigidity required for supporting the rider's weight while also allowing the support unit to freely flex in response to the rider's demands as he pedals, shifting his weight from side to side. Also, the construction of cantilevered, independent seat portions 22 and 24 mounted to support frame 27, beyond the trunk or mounting zone 25, provides the entire rear portion of support unit 20 with flexibility, thereby increasing rider comfort by dampening road shock and vibrations.

In order to provide the rider with additional comfort, seat portions 22 and 24 incorporate contoured areas 30 and 31, respectively. Contoured areas 30 and 31 are formed in a gentle concave configuration and positioned to accommodate the ischial bones of the rider's pelvis. After the padding and the seat cover have been installed in their proper position, the ischial bone protuberances of the rider are vertically aligned with concave areas 30 and 31, and supported by these areas in a lower plane than the overall seat supporting area. In this way, the rider's weight is supported throughout the entire seat area with no single part of the rider, in particular the ischial bones, having to support a concentration of weight. As a result, the rider experiences a more comfortable ride free from pain and sores. Furthermore, since the rider's weight is widely distributed over substantially the entire seat area, travel over rough areas where bouncing results will not injure or discomfort the rider.

The bicycle seat support unit of this invention further enhances the rider's support and comfort by incorporating a plurality of support ribs below the seat portions. As best seen in FIGS. 3, 4 and 5, ribs 41, 42 and 43 are mounted to support frames 27 below seat portion 24 in a cantilevered arrangement. Similarly, seat portion 22 incorporates ribs 44, 45 and 46. As best seen in the cross-sectional area shown in FIG. 3, ribs 41, 42 and 43 have comparatively increasing thicknesses as one progresses from the front of seat portion 24 toward the rear of seat portion 24. In particular, rib 41 is relatively thin throughout its length from support frame 27 to the outer edge of seat portion 24. Rib 42, which is spaced to the rear of rib 41 has a greater thickness than rib 41 and extends from support frame 27 to the outer edge of seat portion 24. Rib 43 is the thickest of the ribs and is positioned at the rear of seat portion 24, extending from frame member 27 to the outer edge of seat portion 24.

In addition to the varying thicknesses of ribs 41, 42 and 43, it is also apparent from FIGS. 3 and 4, that the preferred embodiment of this invention also discloses the mounting of ribs 41, 42 and 43 on support frame 27 in a cantilevered manner with the ribs having progressively increasing lengths, or areas of contact, with support frame 27. In particular, rib 42 extends substantially vertically along support frame 27 a distance more than twice the distance that rib 41 extends along support frame 27. Furthermore, rib 43 extends substantially vertically along support frame 27 a distance greater than rib 42.

By providing cantilevered supporting ribs having varying thicknesses and varying areas of contact with support frame 27, an extremely unique and comfortable supporting structure is achieved. While its thicker rear sections are slightly stiffer, the entire unit 10 is elastically deformable, and, it twists and flexes resiliently under the rider's weight and cycling movement. Since a maximum amount of support and a minimum amount of flexing is required at the rear of seat portion 24, rib 43 is the thickest and the longest of all of the ribs. As one progresses towards the front of seat portion 24, supporting capability is important but flexibility becomes increasingly important since the rider's pedalling movement and weight shifting from side to side causes the forward areas of seat portion 24 to flex in response to the rider's movements. Consequently, a maximum amount of flexing is required along the front edge of seat portion 24. As a result, rib 41 is the thinnest of the ribs and is in contact with support frame 27 over the shortest distance. Rib 42 is positioned close to midway between the front and rear sides of seat portion 24 and thereby comprises a thickness and a length which is between that of ribs 41 and 43, which is commensurate with its cantilevered position in order to impart the required balance of both support and flexing to seat portion 24.

For purposes of simplifying the disclosure and avoiding unnecessary repetition, the construction and arrangement of ribs 44, 45 and 46 of seat portion 22 are not discussed in detail. However, ribs 44, 45 and 46 are positioned and constructed substantially identically to ribs 41, 42, and 43, as detailed above, thereby providing seat portion 22 with a cantilevered supporting arrangement which incorporates both flexibility and rigidity in response to the rider's demands.

As would be obvious to one skilled in the art, any number of ribs and any position of the ribs can be employed with a multitude of varying lengths and thicknesses without departing from the scope of this invention. The only requirement for the number of ribs and their relative sizes is that they take into account the demands placed upon them for supporting strength while also having sufficient flexibility for responding to the rider's pedalling demands.

As briefly mentioned above, the preferred embodiment of bicycle seat support unit 20 comprises a seat member 21 which incorporates two independent seat portions 22 and 24. By providing two independent seat portions 22 and 24 which are mounted in a cantilevered arrangement, the unique combination of both support and flexibility is enhanced.

Since the bicycle rider continuously shifts his weight from side to side as he pedals, only the side of the seat upon which the weight shift pressure is placed needs to flex at that particular time. Of course, this process is continuously reversed from side to side. As a result, the Applicant has found that an extremely comfortable, supported ride is provided by bifurcating the prior art one-piece member into two independent seat portions. Furthermore, by mounting the two independent seat portions 22 and 24 to support frame 27 in a cantilevered arrangement, the flexibility of each seat portion is enhanced without affecting the weight supporting capability of the seat.

As best seen in FIGS. 6 and 7, seat portions 22 and 24 extend from support frame 27 in opposite directions in a cantilevered arrangement with both seat portions supported at one end thereof which merges or blends integrally with support frame 27. Since both seat portions 22 and 24 merge or blend with support frame 27 at substantially the same location, seat portions 22 and 24 form a substantially winged-like or V-shaped intersection at their supported ends. This arrangement has been found to produce an extremely comfortable flexible ride for the user, while also providing the user with a high degree of weight support. This combination of support and flexibility has heretofore been unobtainable with prior art single seat member constructions.

Seat portions 22 and 24 may also be pitched upward as may be seen in FIGS. 6 and 7 in order to accommodate the initial flexing exerted by the rider's weight. Therefore, the outer points of member 24 and 22 would be above the horizontal plane of the unit, when the unit is not in use.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A unitary molded cycle seat undercarriage T-shaped in plan and adapted for interconnected retention with padding material and a cycle saddle cover and mounting to a cycle, comprising:
   A. a unitary, centrally-located frame portion positioned for mounting to a cycle and incorporating a rearward vertically disposed base section; and
   B. two independent seat portions integrally connected to said vertical base section along a single edge of each of the seat portions, with the remainder of the seat portions extending from their respective edges in a cantilevered arrangement forming in rear elevation a substantially Y-shaped configuration therewith, with the two independent seat portions forming the arms of the "Y" and the base section forming the vertical portion of the "Y," thereby imparting a flexible supporting quality to said seat portion.

2. A molded cycle seat undercarriage T-shaped in plan and adapted for interconnected retention with padding material and a cycle saddle cover and mounting to a cycle comprising:
   A. a forwardly extending nose portion;
   B. a unitary, centrally-located frame portion interconnected with said nose portion and positioned for mounting to a cycle and incorporating a rearward vertically disposed base section; and
   C. a seat portion incorporating
      a. two independent seat sections
      b. each of said seat sections being independently mounted to said vertical base section along a single edge of said seat section, and extending from said base section in a cantilevered arrangement, forming in rear elevation a substantially Y-shaped configuration with the two independent seat sections forming the arms of the "Y" and the base section forming the vertical portion of the "Y."

3. A molded cycle seat undercarriage as defined in claim 2, further comprising:
   D. support rib means a. mounted directly to the underside of each of the seat sections along substantially their entire length, and
  b. extending between said base section and said seat sections, along a major portion of the width of the seat section, thereby imparting flexible supportive movement to said seat sections.

4. The molded cycle seat undercarriage defined in claim 3, wherein said undercarriage is a unitary, integral structure.

5. The molded cycle seat undercarriage defined in claim 4, wherein said unitary structure is molded from plastic.

6. The molded cycle seat undercarriage defined in claim 3, wherein a plurality of support ribs are independently mounted to each of said seat sections, with each of said support ribs comprising different thicknesses, thereby providing controlled variable flexing and supporting capabilities throughout said seat sections.

7. The molded cycle seat undercarriage defined in claim 6, wherein said support ribs are arranged laterally extending from said frame portion below said seat sections with the varying rib thicknesses progressively increasing from front to back, thereby providing maximum flexing to the front of the seat sections and maximum support to the rear of the seat sections.

8. The molded cycle seat undercarriage defined in claim 3, wherein said support ribs join the frame portion beneath said seat sections along junction lines of successively increasing lengths.

9. The molded cycle seat undercarriage defined in claim 3, wherein each of said cantilevered seat sections is further defined as incorporating
  a. at least three independent variable size support ribs extending from said frame portion to the bottom of said seat section,
  b. one of said support ribs forming the rear of said seat section and comprising the largest of the ribs, and
  c. one of said ribs forming the front of said seat section and comprising the smallest of said ribs,
whereby each of said seat sections comprise maximum supporting capabilities and minimum flexibility at the rear thereof and sufficient supporting capabilities and maximum flexibility at the front thereof.

10. The molded cycle seat undercarriage defined in claim 3, wherein each of said seat sections is further defined as comprising a concave zone formed in the top surface of the seat section.

11. The molded cycle seat undercarriage defined in claim 10, wherein said concave zones of the seat sections are spaced apart a distance substantially equal to the average distance between the ischial bones of an individual, thereby providing a cycle seat which delivers an extremely comfortable supported ride without uncomfortable annoyance due to ischial bone contact against a rigid area.

12. The molded cycle seat undercarriage defined in claim 3, wherein said frame portion is further defined as comprising two parallel support areas,
  a. integrally formed within said support frame, and
  b. forming a clamp retaining zone, whereby a cycle post clamp is securely mounted in position for interconnection with a cycle post.

13. The molded cycle seat undercarriage defined in claim 12, further comprising
  E. a bridge member
    a. removably mounted between the rear of said nose portion and the front of said seat portion for spanning and covering the clamp retaining zone, and
    b. having an arched shape with a portion thereof lying in substantially the same plane as the nose portion and the seat portion, thereby preventing unwanted entry into the clamp retaining zone.

14. The molded cycle seat undercarriage defined in claim 13, wherein said removable bridge is securely mountable to said support unit forming a substantially integral unit therewith.

15. The molded cycle seat undercarriage defined in claim 14, wherein said nose portion incorporates a recess at the rear thereof and said removable bridge is further defined as comprising
  a. a depending tab vertically extending near one end thereof, and
  b. two arms laterally extending from the other end thereof,
whereby said bridge is securely mounted to said undercarriage with the arms retainingly embracing the frame portion below said seat portion and the tab is securely mounted in the cooperating recess of said nose portion.

16. The molded cycle seat undercarriage defined in claim 12, further comprising
  E. a bridge portion integrally molded between the rear of said nose portion and the front of said seat portion, spanning and covering the clamp retaining zone.

* * * * *